(12) United States Patent
Matsuoka

(10) Patent No.: US 6,841,135 B2
(45) Date of Patent: Jan. 11, 2005

(54) CATALYST CARRIER FOR EXHAUST GAS PURIFICATION SYSTEM AND METHOD FOR PRODUCING SAME

(75) Inventor: Katsunori Matsuoka, Akisima (JP)

(73) Assignee: Showa Aircraft Industry Co., Ltd., Tokyo (JP)

( * ) Notice: Subject to any disclaimer, the term of this patent is extended or adjusted under 35 U.S.C. 154(b) by 825 days.

(21) Appl. No.: 09/814,428

(22) Filed: Mar. 21, 2001

(65) Prior Publication Data

US 2001/0043892 A1 Nov. 22, 2001

(30) Foreign Application Priority Data

May 15, 2000 (JP) ........................................ 2000-141356

(51) Int. Cl.⁷ .......................... B01D 50/00; B01D 53/34
(52) U.S. Cl. ...................................... 422/180; 422/177
(58) Field of Search ............................... 422/180, 177, 422/168, 181

(56) References Cited

U.S. PATENT DOCUMENTS

| | | | |
|---|---|---|---|
| 4,381,590 A | * | 5/1983 | Nonnenmann et al. ....... 29/890 |
| 5,002,923 A | * | 3/1991 | Koshiba et al. .............. 502/439 |
| 5,084,361 A | * | 1/1992 | Toyoda et al. ............... 428/593 |
| 5,110,690 A | * | 5/1992 | Usui et al. ................... 428/678 |
| 5,336,472 A | * | 8/1994 | Toyoda et al. ............... 422/177 |
| 6,371,360 B1 | * | 4/2002 | Maus et al. .................. 228/181 |

FOREIGN PATENT DOCUMENTS

| | | | | |
|---|---|---|---|---|
| JP | 402035940 A | * | 2/1990 | ............ B01J/35/04 |
| JP | 7-39765 | | 2/1995 | |
| JP | 8-281123 | | 10/1996 | |

* cited by examiner

Primary Examiner—M. Alexandra Elve
(74) Attorney, Agent, or Firm—Baker Botts, L.L.P.

(57) ABSTRACT

According to the invention, there are provided catalyst carrier 14 for an exhaust gas purification system, and the method therefor. The catalyst carrier 14 has a honeycomb structure formed of a roll of bands of stainless steel-made one corrugated sheet 1 and one plain sheet 2, which hold stainless steel-made bonding assistants 15 therebetween. Said bonding assistants 15 have width narrower than those of said sheets 1,2, wherein they are positioned at locations radially inside the projections 6 formed at side ends of the corrugated sheet 1 and have thickness T greater than height H of projections 6. Thus, corrugated sheet 1 and plain sheet 2 are diffusion bonded to each other with locally centered high contact pressure, without the influence of projections 6.

7 Claims, 10 Drawing Sheets

Thickness of bonding assistant (μm)

Width (mm) of a single assistant

Number and relative width of bonding assistants

CATALYST CARRIER FOR EXHAUST GAS PURIFICATION SYSTEM AND METHOD FOR PRODUCING SAME

BACKGROUND OF THE INVENTION

1. Field of the Invention

The present invention relates to a catalyst carrier for an exhaust gas purification system and a method for producing the catalyst carrier. More particularly, it relates to the catalyst carrier having a honeycomb structure formed by winding stainless steel-made corrugated sheet and plain sheet, and said sheets are covered with a catalyst material.

2. Description of the Prior Art

<<Background>>

Two-wheeled cars such as motor bikes and scooters and four-wheeled cars are provided each with an exhaust gas purification device for discharging exhaust gas containing harmful substances from engines. The conventional exhaust gas purification device has a catalyst carrier of a honeycomb structure comprising, typically, a corrugated sheet and a plain sheet which are wound to a roll and which are provided with a catalytic material layer. By passing the exhaust gas through cell spaces formed in catalyst carrier, harmful substances contained in the gas react with the catalytic material and are purified. The device and, accordingly, catalyst carrier is used in severe conditions of high temperature or repetition of heating and cooling, and in a trembling condition.

For conventional catalyst carrier, sheets were made of ferrite type stainless steel containing aluminum, and a nickel based brazing agent was used to bond sheets to each other.

The temperature of catalyst carrier rises to 700° C. or higher due to a catalytic reaction during running of the car, and even higher than 1,000° C. recently when a high performance catalyst is used. Unburned raw gas is sometimes discharged from engines. A large amount of unburned gas is discharged particularly by two-wheeled cars. Such unburned gas is often ignited when it reaches catalyst carrier and burns to raise the carrier temperature to over 1,200° C. To cope with this situation, aluminum contained in stainless steel sheets forms an $Al_2O_3$ protective oxidized film, which prevents the sheets from being oxidized.

<<Heat-Resistant Property>>

It has been pointed out that the oxidation-resistant and heat-resistant properties of sheets become unstable by unusual oxidation or re-melting phenomenon of the brazing agent.

According to the prior art, nickel, a main component of the brazing agent, disperses to corrugated sheet or plain sheet and reacts with aluminum to deposit $Ni_3Al$, an intermetallic compound, resulting in reducing aluminum in sheets at brazed portions and reducing their oxidation resistant lives. When the carrier temperature rises to over 1,050° C., aluminum in sheets reacts with nitrogen in air to deposit AlN, reducing still more aluminum in the sheets. Due to these reasons, the oxidized film of $Al_2O_3$ of sheets decreases and the oxidation resistant properties of the sheets of the catalyst carrier is reduced, causing abnormal oxidation, particularly at the portions where sheets are brazed to each other.

In addition, boron and silicon, added to the brazing agent as melting point depressants to make easier the brazing work, move to the sheets and depress the melting point by heat. Consequently, when the carrier sheets are heated to above 1,200° C., brazed portions are melted again and portions surrounding the brazed portions in the sheets are melted or pores are formed.

<<Adoption of Diffusion Bond>>

A technology has been developed recently to diffusion bond a corrugated sheet to a plain sheet of a catalyst carrier, without using the brazing agent. According to this method, the sheets are directly bonded to each other and, no abnormal oxidation or re-melting phenomenon occurs since no brazing agent is used. Thus, the basic properties of stainless steel sheets are well maintained and the sheets are strong in thermal resistance. Since an expensive brazing agent is not used, the method is superior to the prior art technology.

Problems to be Solved by the Invention

However, problems have been pointed out for the catalyst carrier produced by the diffusion bonding process. In explaining the problems, reference is made to FIGS. 10A to 10I, which illustrate the conventional technology using the diffusion bonding process.

<<Principal Problem>>

Corrugated plate 1 used for this type of a catalyst carrier 3 is normally formed by passing plain sheet between a pair of threaded gears.

Width of carrier 3 and, therefore, width of corrugated sheet 1 varies according to needs and so width of toothed gears is set wider than width to cope with sheet 1 having various width. That is, plain sheet having width, which is narrower than width of a pair of toothed gears, has been processed to form corrugated sheet 1. The formed corrugated sheet 1 has inevitably a shape, wherein triangular projections 6 are formed at right and left side ends at the top and the bottom of the sheet 1.

Projections 6 have width of about 5 mm and height of about 15 $\mu$m. When corrugated sheet 1 having projections 6 and plain sheet 2 are wound to a roll and are diffusion bonded, the obtained carrier of the first prior art example has a shape illustrated in FIGS. 10A to 10C. As will be clear from these figures, the rolled sheets 1 and 2 are diffusion bonded at projecting ends 7 of the projections 6 of sheet 1 in a point contact manner. That is, they are bonded only at small points.

It has been pointed out that the bonding strength between sheets 1,2 is insufficient since the sheets 1,2 are only spot bonded to each other.

<<Other Problems>>

In order to overcome the drawbacks above, it has been proposed to use a pair of toothed gears 8 shown in FIGS. 10D and 10E, of a second prior art example. Gears 8 had a special form wherein the side ends of the tooth of toothed gear are rounded to form a corrugated sheet 9 having no projections 6 at side ends, contrary to gears of the invention where the side ends are not rounded. In the catalyst carrier 3 of the second prior art example, corrugated plate 9 is bonded linearly to plain sheet 2 and, therefore, the bonding strength between sheets 1,2 is higher than that of the carrier 3 of the first prior art example.

However, gears 8 of the second example have not practically been used for the reason of the costs. This is because special form toothed gears 8 should be prepared for each of different sized corrugated sheets 1 and carriers 3.

A third prior art example, not shown, is to apply a strong tension from backside to plain sheet 2 when corrugated sheet 1 and plain sheet 2 are wound to from a roll. According to the example, the sheets 1,2 are inserted into cylinder while the sheet 2 is strongly tensioned, to form catalyst carrier 3. By applying the tension force, the bonding strength between sheets 1,2 is increased and whereby the carrier 3 has an enough strength. But it is difficult to insert the sheets 1,2 roll into cylinder while the sheet 2 is tensioned, and it needs high skill and experience. Further, this example does not solve the problem relating to projections 6 of corrugated sheet 1, as pointed out for prior art example 1.

The fourth solution for increasing the contact area between sheets 1,2 and, thereby increasing the bonding strength includes pressing only the side ends of corrugated sheet 1 to forcibly remove projections 6, using a special form corrugated sheet 1 having no rounded ends, and/or removing the surface roughness of the sheets 1,2.

The solution, however, requires costs for the steps of pressing the side ends, preparing special form sheet 1 and for removing the roughness. Further, even if these steps are carried out, the problem relating to projections 6 is not solved.

The fifth solution, not shown, is to form a throttled portion in cylinder after sheets 1,2 roll was inserted therein, mechanically or by the use of the thermal expansion difference from jig or other tool used, for increasing the contact strength between sheets 1,2 locally and for increasing the bonding strength. The solution also is defective in the point of the cost, as an additional work is necessary for forming the throttled portion.

The sixth prior art example shown in FIGS. 10F and 10G is discussed in Japanese Unexamined Patent Publication (Kokai) 7-39765. In the example, belt-like second plain sheet 11 is inserted between sheets 1 and 2 at side ends, for increasing the contact strength between sheets 1,2 locally and for increasing the bonding strength.

According to the sixth example, an area between plain sheet 2 and second plain sheet 11 is diffusion bonded. But the portion between corrugated sheet 1 and second plain sheet 11 is bonded in a spot-like manner as has been pointed out with reference to prior art example 1. That is, sheets 1 and 11 are only point-bonded to each other at ends (points) of projections 6 and, therefore, the bonding strength is insufficient.

The seventh prior art example shown in FIGS. 10H and 10I is discussed in Japanese Unexamined Patent Publication (Kokai) 8-281123. It shows inserting belt-like thin film 12 between sheets 1 and 2 while they are wound to a roll, at the portion remote from side ends of the sheets 1,2, to form a swelled portion 13 around the roll. The roll is then inserted into cylinder 10 whose inner diameter corresponds to an outer diameter of the portion of the roll not swelled. Since the roll having swelled portion 13 is forcibly inserted into cylinder 10, the swelled portion 13 is throttled whereby the contact pressure between sheets 1,2 is increased and the bonding strength between the sheets 1,2 is increased.

However, the forcibly inserting step requires a strong pressing force, resulting in increasing the cost for carrying out the step and for the tool required therefor. Further, the corrugated form may be collapsed by the force applied.

SUMMARY OF THE INVENTION

According to the invention, a novel catalyst carrier for an exhaust gas purification system and a method for producing the catalyst carrier are provided to overcome the above mentioned problems. The carrier is made by winding thin belt-like bonding assistants between belt-like corrugated sheet and plain sheet when the sheets are wound, wherein each of the assistants is positioned radially inside from the projections formed at side ends of the corrugated sheet. The assistants has a thickness greater than the height of the projections and a predetermined width, and is used in pairs via the plain sheet.

The catalyst carrier of the invention has a full bonding strength in spite that the sheets are diffusion bonded, has increased resistance to trembling and heat and increased thermal stress easing properties. It is produced by a simplified process at a low cost.

DETAILED DESCRIPTION OF THE INVENTION

<<Catalyst Carrier of the Invention>>

According to the invention, there is provided a catalyst carrier for an exhaust gas purification system, comprising bands of stainless steel-made at least one corrugated sheet and at least one plain sheet which hold stainless steel-made bonding assistants therebetween, wherein said bonding assistants have a width narrower than those of said sheets, wherein said sheets are alternated and are wound to form a roll having a honeycomb structure comprising a number of cell spaces, wherein catalyst materials are adhered to sheets, wherein said sheets are diffusion bonded to each other via bonding assistants, wherein said bonding assistants are positioned at locations radially inside the projections formed at side ends of the corrugated sheet during passing the corrugated sheet through a pair of toothed gears, and wherein said bonding assistants have a thickness greater than the height of the projections.

According to claim 2, there is provided a catalyst carrier of claim 1, comprising one corrugated sheet and one plain sheet, each being made of stainless steel containing aluminum, wherein both sheets have substantially same length and width, and the length of assistants is substantially same as that of the both sheets.

According to claim 3, there is provided a catalyst carrier of claim 1, wherein the assistants are positioned at locations 5 mm or more inside the side ends of said sheets, and have a thickness of from 20 to 200 $\mu$m.

According to claim 4, there is provided a catalyst carrier of claim 3, wherein the assistants are used in a pair or pairs via a plain sheet, and wherein the width of an assistant is 0.5 to 5 mm, and the ratio of the total width of all assistants to the width of the sheets is 0.3 to 20%.

According to claim 5, there is provided a catalyst carrier of claim 4, wherein each in paired assistants faces to the other via plain sheet to increase the contact pressure between the corrugated- and plain-sheets.

According to claim 6, there is provided a catalyst carrier of claim 4, wherein each in paired assistants is shifted to the other via the plain sheet to increase thermal stress easing properties.

<<Method for Producing the Catalyst Carrier of the Invention>>

According to claim 7, there is provided a method for producing a catalyst carrier for an exhaust gas purification system, comprising, winding bands of stainless steel-made at least one corrugated sheet and at least one plain sheet with stainless steel-made bonding assistants therebetween, to form a roll, wherein said bonding assistants have a width narrower than that of said sheets, and said sheets are alternated, wherein said bonding assistants are positioned radially inside from projections, which are formed at side ends of corrugated sheet during passing sheet through a pair of toothed gears, and heating the roll to diffusion bond said sheets to each other via the bonding assistants, to produce the roll having a honeycomb structure comprising a number of cell spaces, and adhering catalyst materials to said sheets and to bonding assistants.

<<Functions and Effects>>

According to the invention, the catalyst carrier comprises a roll of a corrugated sheet and a plain sheet with bonding assistants therebetween, and has a honeycomb structure of a number of cell rooms. The corrugated sheet and the plain sheet are of a belt-type, and are made of stainless steel containing aluminum. The corrugated sheet has projections having about 5 mm width and about 15 μm height.

The bonding assistant is a narrow wide belt, made of stainless steel, and is positioned inside from the location of the projections formed at side ends of the corrugated sheet, and has a thickness greater than the height of the projections. Concretely, each of the assistants is positioned 5 mm or more inside the positions of the side ends of the sheets, and has a thickness of 20 to 200 μm. The assistants are used in a pair or pairs via a plain sheet, and wherein the assistant has 0.5 to 5 mm width, and the ratio of the total width of all assistants to the width of the sheets is 0.3 to 20%. Further, each in paired assistants faces to the other or is shifted to the other via the plain sheet.

Since the corrugated- and plain-sheets are wound with bonding assistants therebetween, they are free from the influence of the projections of the corrugated sheet. The sheets are diffusion bonded radially at short lines with locally centered high contact pressure. The produced catalyst carrier is, thus, improved in strength with regard to the resistance to trembling and heat, in thermal stress easing properties. With the use of bonding assistants, the catalyst carrier is produced easily at low cost.

BRIEF DESCRIPTION OF THE DRAWINGS

The invention is explained with reference to attached drawings, wherein:

FIGS. 10A through 10I each shows prior arts and wherein

FIG. 10A is a sectional plan view of the first example of prior art sheets;

FIG. 10B is a sectional side view of the first example of the prior art;

FIG. 10C is a sectional front view of the first example of the prior art;

FIG. 10D is a front view of the second example of the prior art at production;

FIG. 10E is a sectional plan view of a corrugated sheet of the second example of the prior art;

FIG. 10F is a perspective view of the sixth example of the prior art at production;

FIG. 10G is a sectional plan view of the sixth example of the prior art;

FIG. 10H is a perspective view of the seventh example of the prior art at production; and FIG. 10I is an explanatory view of inserting carrier of the seventh example into a cylinder.

EMBODIMENTS

Figure 1A:
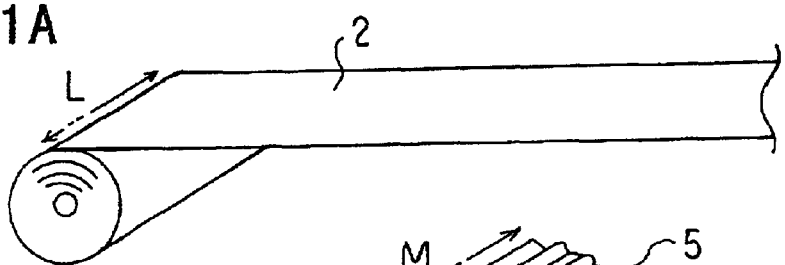
FIG. 1A is a perspective view of a plain sheet to be prepared.
Figure 1B:
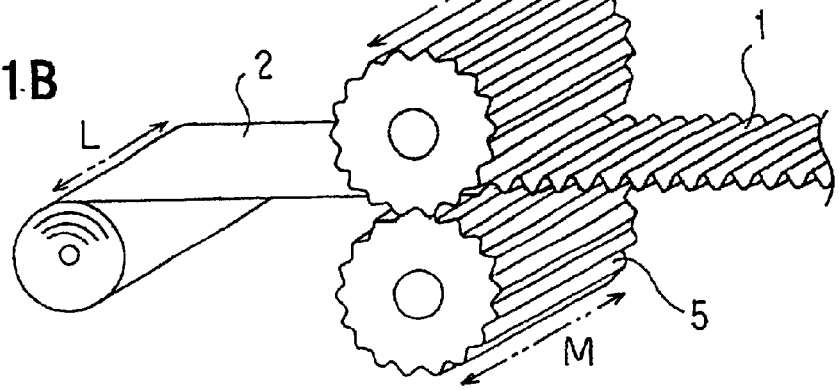
FIG. 1B is a perspective view of a corrugated sheet during being passed through a pair of toothed gears.
Figure 1C:
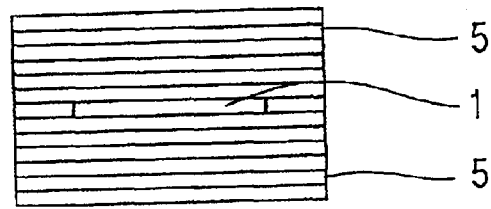
FIG. 1C is a front view of FIG. 1B.

Catalyst carrier 14 of the invention is produced by the steps of ①preparing sheets 1 and 2, ②preparing bonding assistants 15, ③winding, ④diffusion bonding and ⑤production of catalyst carrier 14. The invention is explained with each of the steps above.

<<① Preparation of Corrugated Sheet>>

FIGS. 1A through 1E are referred to. Corrugated sheet 1 and plain sheet 2 of catalyst carrier 14 are made from a thin foil stainless steel sheet having a 200 μm, 100 μm or 50 μm thickness. A ferrite stainless steel containing aluminum, such as Fe-20Cr-5Al alloy and Fe-18Cr-3Al alloy are typically used because the sheets 1,2 are used in a high temperature atmosphere and at a portion where heated and cooled conditions are repeated.

The surfaces of corrugated sheet 1 and plain sheet 2, i.e., the surface of ferrite stainless steel, are covered by a protective oxidized film of $Cr_2O_3$. But the film is reduced at a temperature range at 800° C. or higher, whereby it loses its protecting properties to oxidation. Therefore, the film on the surfaces of the sheets 1,2 contains $Al_2O_3$ (alumina) in addition to $Cr_2O_3$. $Al_2O_3$ is not reduced even at a high temperature of 1,200° C. or higher whereby it prevents sheet 1 or 2 from being oxidized, see FIG. 5D.

Plain sheet 2 is produced by unrolling a roll to a plain belt of a 10 mm to 150 mm width, and by cutting the belt to a suitable length, as shown in FIG. 1A.

Corrugated sheet 1 is produced by passing plain sheet 2 obtained by unrolling a roll between a pair of toothed gears 5 under heat and pressure, as shown in FIGS. 1B, 1C, 1D and 1E. Produced corrugated sheet 1 has repeated waves having a predetermined height running widthwise, with a width L of 10 mm to 150 mm, and is cut to a certain length. Width L and the length of corrugated sheet 1 are same as those of plain sheet 2.

The cross section of the wave is typically a triangle having a dull edge.

Width M of toothed gears 5 is wider than width L of sheet 1 or 2, so that a single pair of rollers can process corrugated sheets 1 of various widths L. That is, a pair of gears 5 having about 200 mm width can process plain sheets 2 of a width of 150 mm, 100 mm, 75 mm, 50 mm, etc.

Figure 1D:
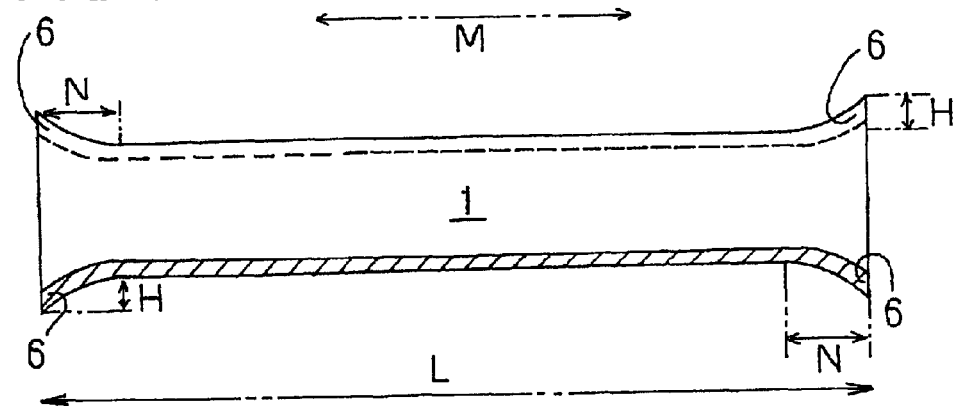
FIG. 1D is a plan view of a processed corrugated sheet.
Figure 1E:
FIG. 1E is a schematic side view of a processed corrugated sheet.

The wave of corrugated sheet 1 processed by toothed gears 5 has, inevitably, a form shown by a sectional plan view shown in FIG. 1D. That is, corrugated sheet 1 has a pitch at right and left ends narrower than that at the center portion, and projections 6 projected from the right and left ends are formed thereby. The projection has a shape of gently sloping triangular half. Projection 6 has width N of about 5 mm starting from the beginning of the slope, and height H of about 15 $\mu$m. In other words, projection 6 starts from about 5 mm (width N) inside the right and left ends, and projects about 15 $\mu$m (height H) from the center portion.

<<(2) Preparation of Bonding Assistant>>

FIGS. 2 and 5 are referred to. Bonding assistant 15 is used in winding step(3), mentioned later, and functions as a bonding portion at a diffusion-bonding step(4) mentioned later. The assistant can be made of various types of stainless steel. When it is made of normal ferrite such as SUS 430 and SUS 409, a higher diffusion speed is obtained whereby the diffusion bonding step(4) proceeds swiftly. On the other hand, when it is made of normal austenite type stainless steel such as SUS 304 and SUS 309 having a greater thermal expansion coefficient, the contact pressure between the corrugated sheet 1 and the plain sheet 2 is increased. Thus, the assistant which is excellent in bonding strength is obtained.

When sheets 1 and 2 are diffusion bonded to each other using bonding assistant 15, chromium and aluminum components are diffused from sheet 1 or 2 of the ferrite stainless steel to assistant 15. As the result, assistant 15 is integrated to the sheets and a protective layer of $Cr_2O_3$ and/or $Al_2O_3$ are formed whereby the bonding portions become oxidation resistant.

When bonding assistant 15 is made of a material same as that of the sheets 1 and 2, that is, when the assistant 15 is made of ferrite type stainless steel, Fe—Cr—Al alloy, it shows most strong oxidation resistant properties.

Figure 5A:
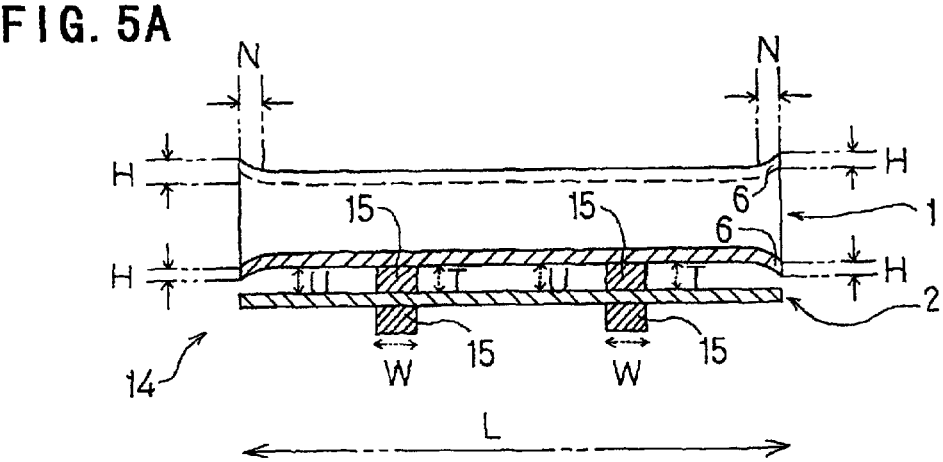
FIG. 5A is a sectional plan view of the main part of the carrier.

Assistant 15 is a thin belt having a thickness T of from 20 to 200 $\mu$m, generally 30 to 50 $\mu$m. In FIG. 5A, assistant 15 has thickness T of 20 $\mu$m or more which is thicker than around 15 $\mu$m height H of diffusion projection 6 formed at side ends of corrugated sheet 1 as mentioned earlier. Assistant 15 is used as a bonding portion between sheets 1 and 2. Thickness T is maximum 200 $\mu$m since if T is too great, gap U between sheets 1 and 2 is broadened, resulting in the reduction in the bonding strength. Further details will be discussed in Example 1.

Assistant 15 has width W of 0.5 to 5 mm, because the practical smallest value of width W of a stainless steel band, which can be cut in consideration of cost, is 0.5 mm. Therefore, width W is 0.5 mm or more, and 5 mm or less because if it is greater than 5 mm, the contact pressure between sheets 1 and 2 is distributed widely and is decreased. As the result, no locally concentrated high pressure is obtained and the bonding strength between sheets 1,2 is lowered. Further details will be discussed in Example 4. Narrow belt-shape bonding assistant 15 of such thickness T and width W has a length substantially similar to those of sheet 1 or 2.

<<(3) Winding step>>

FIGS. 2, 5 and 6 are referred to. At the winding step(3), stainless steel sheets 1 and 2 with assistants 15 therebetween are wound to form a roll.

Figure 2A:
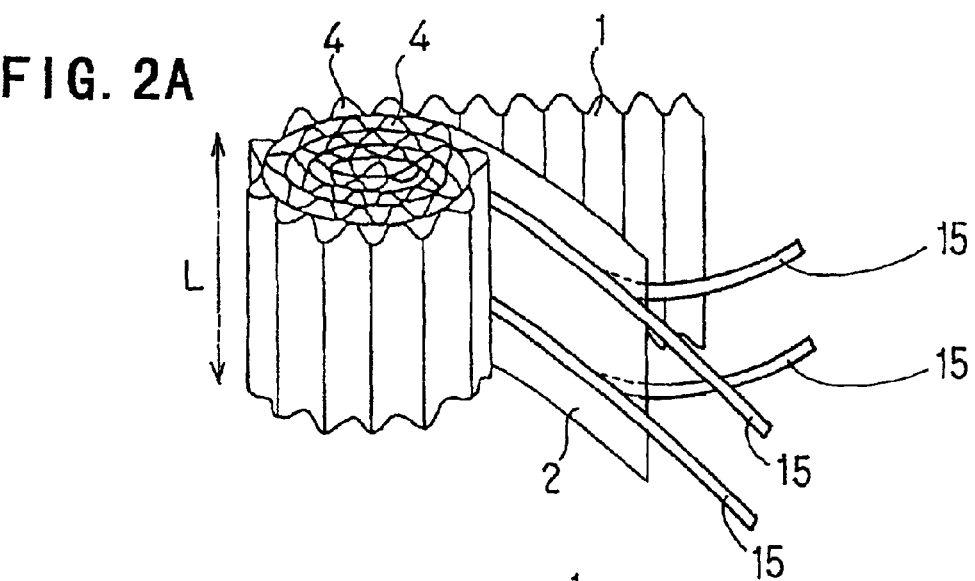
FIG. 2A is a perspective view of sheets during winding wherein a single plain sheet is used (single structure)
Figure 2B:
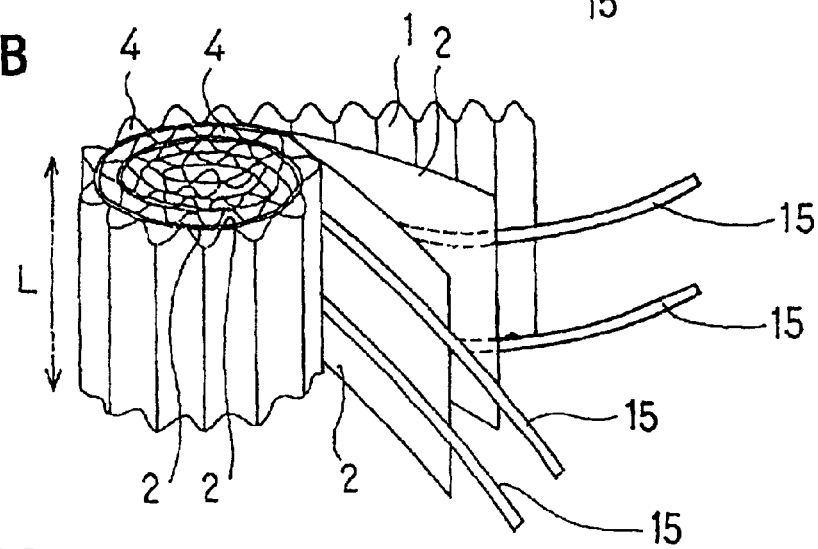
FIG. 2B is a perspective view of sheets during winding wherein two plain sheets are used at the first part of a sheet roll and then a single plain sheet is used (semi-double structure)
Figure 2C:
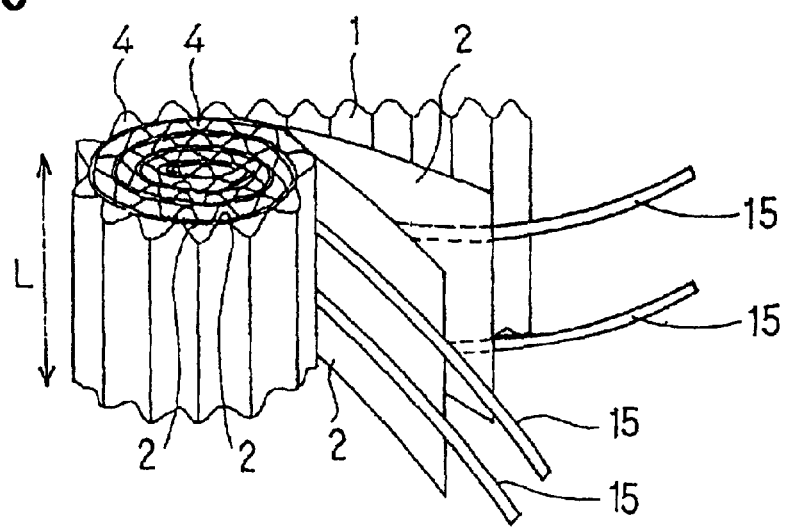
FIG. 2C is a perspective view of sheets during winding wherein two plain sheets are used for all portions of the sheet roll (double structure)

As will be clear from FIGS. 2A to 2C, corrugated sheet 1, one or more plain sheets 2 of a length same as that of sheet 1, and one or more thin diffusion assistants 15 are superimposed with each other. Then they 1,2 are wound to form a round roll of multiple layers.

Specifically, FIG. 2A shows a single plain sheet structure, which is most often used, comprising a single corrugated sheet 1 and a single plain sheet 1. FIG. 2B shows a semi-double plain sheet structure wherein a single corrugated sheet 1 and two plain sheets 2 are used at the outer portion of the roll while one sheet 1 and one plain sheet 2 are used at the inner portion. That is, one plain sheet 2 is used to partway and then two plain sheets 2 are used. FIG. 2C shows a double plain sheet structure wherein one corrugated sheet 1 and two plain sheets 2 at all windings. In FIGS. 2B and 2C, a two plain sheets 2 winding is shown by a thick line while one plain sheet 2 winding is shown by a thin line.

Catalyst carrier 14 of the semi-double or double structure is used in the case where the carrier is strongly trembled and thermally stressed and, therefore, high tremble resistant properties and high thermal stress easing properties are required. In the semi-double or double structure, no local contacting pressure is produced between two plain sheets 2 and the sheets 2 are not diffusion bonded to each other, though a contacting pressure between corrugated sheet 1 and plain sheets 2 are maintained. Therefore, since the plain sheets 2 slide on each other, the structure is improved in the tremble-resistant and thermal stress easing properties.

Bonding assistant 15 normally is not put between plain sheets 2 for these structures. In some case, even a bonding preventive agent is coated to plain sheets 2. However, when catalyst carrier 14 is weak in maintaining its shape such as when axial width L of sheet 1 or 2 are short, a minimum number of bonding assistants may be put between sheets 2 to improve the shape-maintaining properties.

To put assistant 15 between sheets 1 and 2 at the winding step(3), the assistant 15 is axially arranged at the position radially inside projection 6. As has been described, projections 6 are formed about 5 mm (width N) inside the ends of sheet 1. To be away from projections 6, assistants 15 are positioned more than 5 mm inside the ends.

Bonding assistants 15 are used in pair or pairs via plain sheet 2 or sheets 2, as shown in FIGS. 2A–2C, 5A and 6. The total width of the assistant 15 or assistants 15 is 0.3 to 20% of width L of sheet 1 or 2.

Assistant 15 has 0.5 to 5 mm width W as discussed previously and a single or a plurality number of assistants 15 may be used in pair or pairs.

The total of width W of assistants 15 is regulated by width L of sheet 1 or 2. As has been stated, minimum width W is 0.5 mm and the minimum number of the assistant 15 is one. Maximum width L of sheet 1 or 2 for catalyst carrier 14 is normally 150 mm. Therefore, the minimum ratio of the assistant 15 to width L is calculated by a formula (0.5/150)× 100, i.e., 0.3%. The ratio of the total should be 20% or less. If the ratio is over 20%, the contacting pressure between sheets 1 and 2 becomes insufficient for a required contacting strength between sheets 1,2. This matter will be discussed in Example 3.

Sets or pairs of bonding assistant 15 are used to hold plain sheet 2 therebetween. FIGS. 6A through 6F show paired assistants 15 face to each other via sheet 2, whereby the pressure between corrugated sheet 1 and plain sheet 2 is strengthened. When a bonding assistant 15 at one side of plain sheet 2 faces to that at the other side, the contacting pressure and, accordingly, the contacting strength will be increased. Therefore, catalyst carrier 14 of this type is suitably used for a two-wheeled vehicle such as a motor scooter whose carrier 14 is strongly trembled and has weak thermal stress.

On the contrary, paired assistants 15 shown in FIGS. 6G through 6J do not face to each other, but are shifted to each other via plain sheet 2, whereby the thermal stress easing properties between sheets 1 and 2 are improved. Catalyst carrier 14 of this type is used suitably for a four-wheeled vehicle whose carrier 14 is not strongly trembled and receives repeating thermal stress.

When the catalyst carrier 14 is strongly trembled and receives high thermal stress, there may be used the facing pairs or shifting pairs of assistants 15 in combination with previously mentioned semi-double or double structure of plain sheets 2.

Catalyst carrier 14 used for a strongly trembled vehicle should have bonding surface area as large as possible. For that purpose, the bonding assistant 15 should have greater width W while the number of the assistants 15 used is reduced. On the contrary, carrier 14 used for a vehicle, whose carrier 14 receives strong thermal stress, should receive less stress at each bonding portion to improve the stress easing properties. Therefore, assistants 15 having narrower width W are used and the number of the assistants 15 used are increased.

<<④ Diffusion Bonding Step>>

Figure 3A:
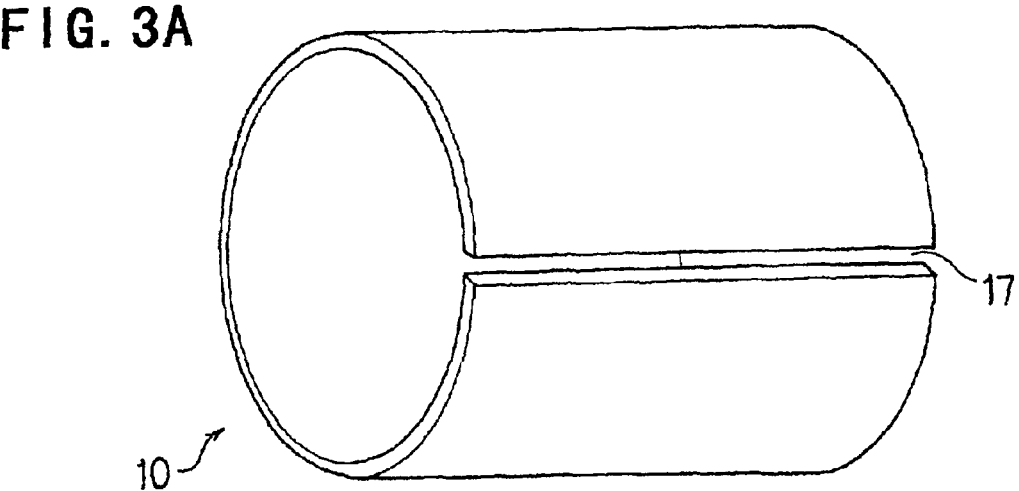
FIG. 3A is a perspective view of a cylinder.
Figure 3B:
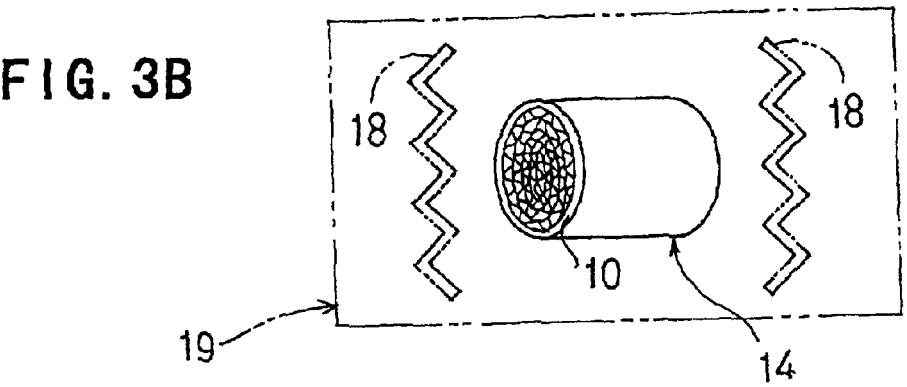
FIG. 3B is a perspective exploded view of a catalyst carrier during diffusion bonding.
Figure 3C:
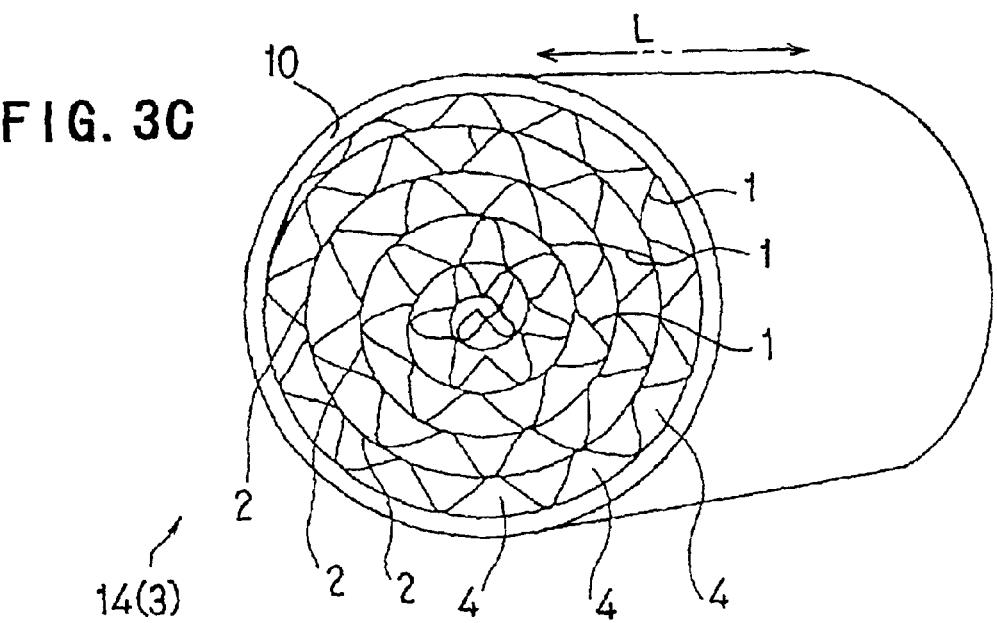
FIG. 3C is a perspective view of a completed carrier.

FIGS. 3A to 3C are referred to. In this step, sheets 1 and 2, which were wound to a roll with one or more bonding assistants 15 at winding step 3 mentioned above, are bonded to each other at bonding positions.

Rolled sheets 1 and 2 receive pressure only for maintaining the wound shape. That is, they 1,2 receive only weak force to maintain the wound form and do not receive strong force to change the shape of corrugated sheet 1.

A roll of sheets 1 and 2 with assistants 15 are inserted into cylinder 10 shown in FIG. 3A. The sheets 1,2 are smoothly inserted without receiving any particular pressure between cylinder 10 and the roll.

Cylinder 10 of stainless steel for example, has slit 17, which may be welded before or after the insertion of the sheets 1,2. A seamless pipe may be used as cylinder 10.

The roll of sheets 1 and 2 with assistants 15, inserted into cylinder 10, is transferred into vacuum furnace 19 having heaters 18 as shown in FIG. 3B and are subjected to a diffusion bonding step④.

The diffusion bonding is carried out in reduced-pressure or deoxidation atmosphere such as in a vacuum, in an argon or inert gas atmosphere, at a temperature between 1,150 to 1,300° C. The process is carried out for 30 minutes to 3 hours. When it is carried out at a high temperature, the time required is shortened while at a low temperature, the time is prolonged. By the heat applied, corrugated sheet 1 is expanded to the direction vertical to the axial direction whereby a locally high contacting pressure is exerted between bonding assistants 15 and sheet 1 and between the assistants 15 and sheet 2, Thus, a high pressure necessary for the diffusion bonding is obtained.

Figure 5B:
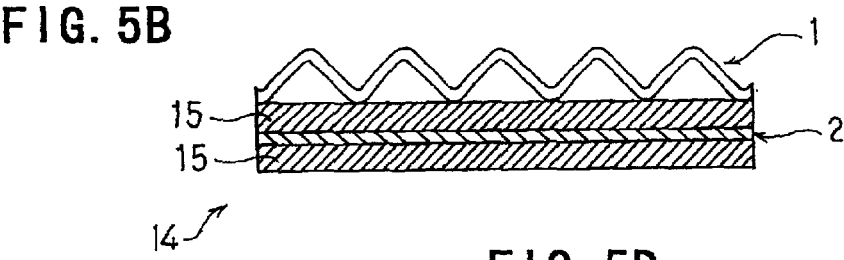
FIG. 5B is a sectional side view of the main part of the carrier.
Figure 5C:
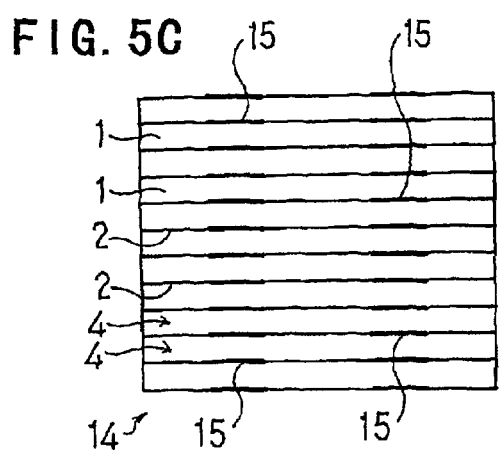
FIG. 5C is a sectional front view of the carrier.

By the process above, the diffusion bonding is effected between corrugated sheet 1 at the top and bottom portions and the corresponding portions of bonding assistant 15, and between plain sheet 1 and all surfaces of the assistants (FIGS. 5A, 5B and 5C). Consequently, sheets 1 and 2 are diffusion bonded to each other at contacting portions of short lined areas via the assistants 15. During bonding, metallic atoms forming the stainless steel move between surfaces of corrugated sheets 1, plain sheets 2 and assistants 15, whereby the contacting portions of sheets 1 and 2 are diffusion bonded in solid phase via the bonding assistants 15.

Figure 6A:
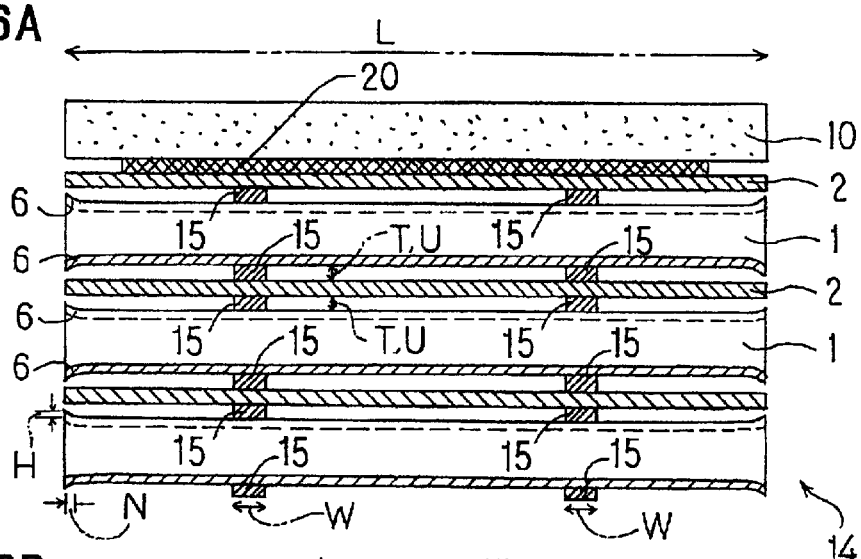
FIG. 6A is a sectional front view of the carrier brazed to a cylinder.
Figure 6B:
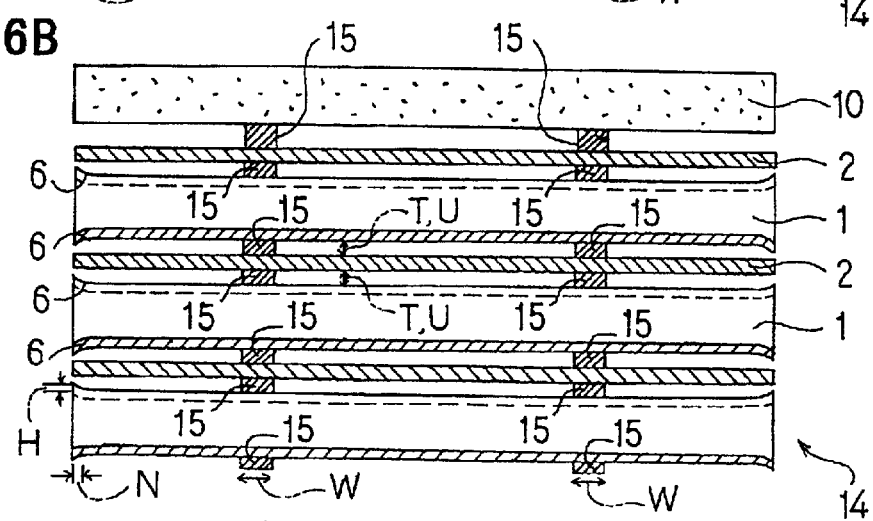
FIG. 6B is a sectional front view of the carrier diffusion bonded to a cylinder.
Figure 6C:
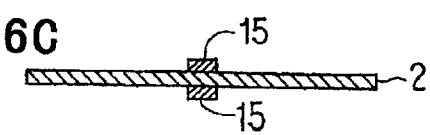
FIGS. 6C to 6F each is a sectional front view of embodiments where each of the paired bonding assistants faces to other.
Figure 6D:
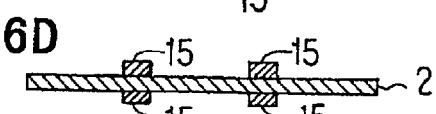
Figure 6E:
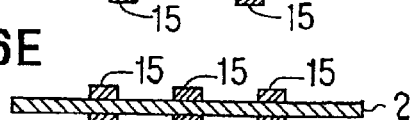
Figure 6F:
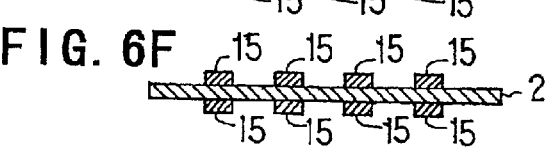
Figure 6G:
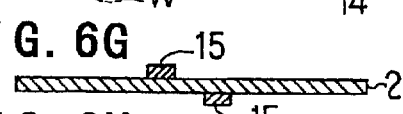
FIGS. 6G to 6J each is a sectional front view of embodiments where each of the paired bonding assistants is shifted to the other.
Figure 6H:
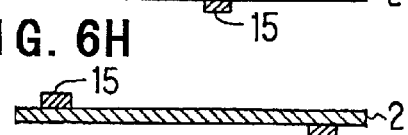
Figure 6I:
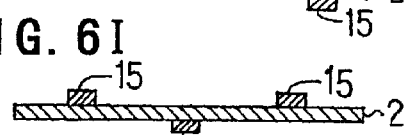
Figure 6J:
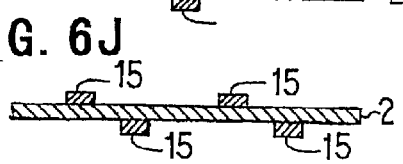

In bonding sheets 1 and 2 to cylinder 10 via the assistants 15, brazing agent 20 may be used as shown in FIG. 6A, since the temperature at the portion near cylinder 10 is relatively low in comparison to that at the core portion of carrier 14.

<<⑤ Catalyst Carrier 14>>

Catalyst carrier 14, shown in FIGS. 3C and 5A through 5C, for use in exhaust gas cleaning system 16 is produced by the steps of ①preparing sheets 1 and 2, ②preparing bonding assistants 15, ③winding and ④diffusion bonding.

The carrier 14 comprises a roll of sheets 1 and 2 with bonding assistants 15 therebetween, and has a honey comb structure comprising a number of cellular spaces 4.

That is, the carrier 14 has a roll shape and a honeycomb structure and is inserted in cylinder 10. A typical roll has a shape of a circular cross-section as shown in FIG. 3A, but the roll may have a form of an elliptical or angular cross-section.

Figure 4A:
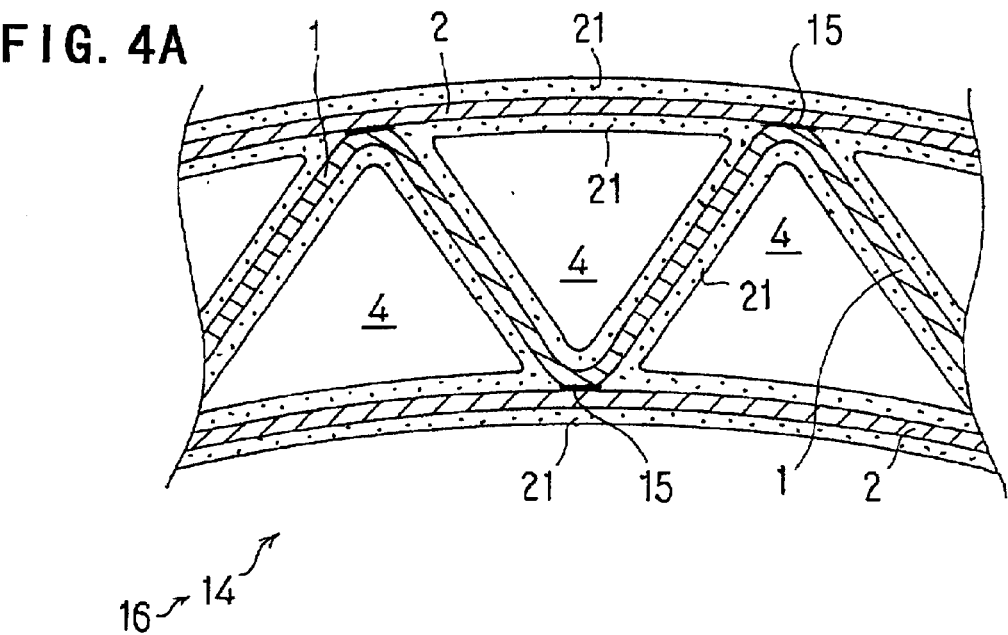
FIG. 4A is a sectional side view of the carrier, partially cut out.

The honeycomb structure comprises a number of hollow columns of cellular spaces, defined by cell walls of corrugated sheets 1 and plain sheets 2, with open column ends. Cell walls and cell spaces 4 have substantially triangular shapes with dull edges in cross-section as shown in FIG. 4A, but they may have trapezoidal or other shapes.

The honeycomb structure is excellent in the strength to weight, is light-weighted, and has high rigidity and strength. Further, it has good rectifying effect, has a great surface area per unit volume, and other excellent features.

Figure 4B:
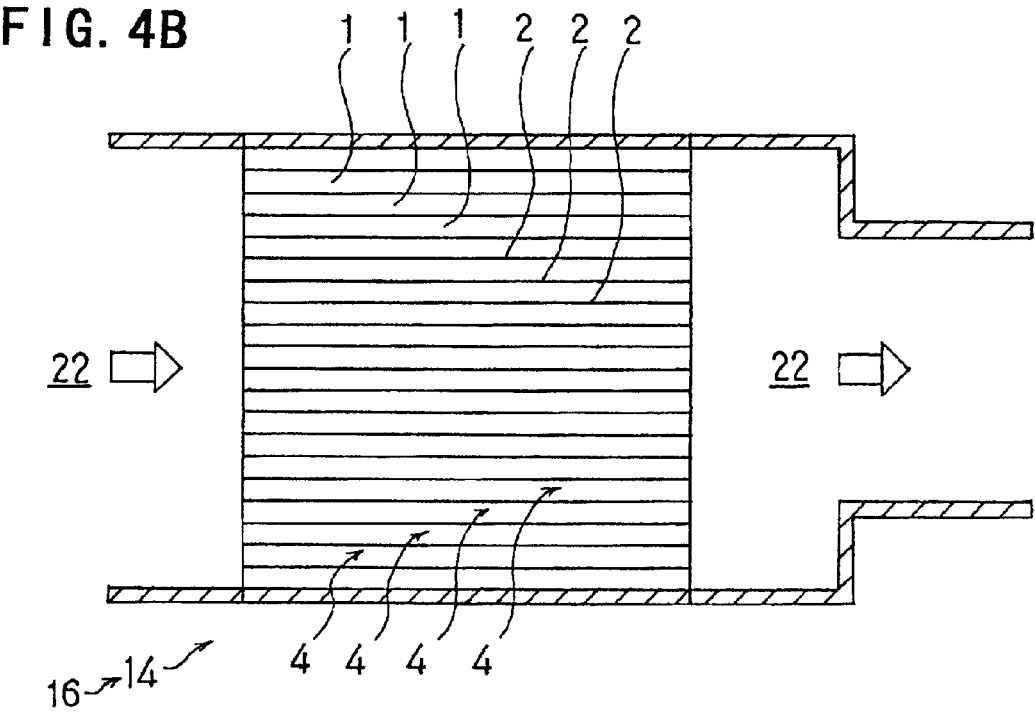
FIG. 4B is a sectional side view of the carrier in use.

According to the invention, catalyst carrier 14 uses the effect of the great surface area per unit volume. Catalyst material 21 is adhered to the surfaces of sheets 1 and 2 and the bonding assistants 15 which constitute cell walls 4 as shown in FIG. 4A. FIG. 4B shows that a greater area for the contact between passing exhaust gas 22 and catalyst material 21 is obtained and that the harmful substance contained in exhaust gas 22 is reacted with catalyst material 21 and is removed, and thereby the exhaust gas is purified.

Catalyst carrier 14 is used under the condition where high temperature exhaust gas 22 passes and where heat is generated by the catalytic reaction. It is used in exhaust gas purifying system 16 for two wheeled cars such as auto-bikes and motor scooters, four wheeled cars, chain saws, and other internal combustion engines.

Catalyst material 21 is selected from materials such as noble metals which react with harmful substance such as carbon monoxide, nitrogen oxide and hydrocarbon, and is coated on the alumina-containing surface of sheets 1 and 2.

Belt-like sheets 1 and 2 of the catalyst carrier 14 are made of stainless steel containing aluminum, and have substantially same length and width L. Corrugated sheet 1 has diffusion projections 6 at both side ends of the top and bottom portions, which are formed when sheet 1 passes through a pair of toothed gears 5. Projection 6 has a substantially triangular pyramid having width N of about 5 mm and height H of about 15 $\mu$m, see FIG. 1D. Bonding assistant 15 used for carrier 14 is made of stainless steel and has a length similar to those of sheets 1 and 2 but have a thinner width, see FIGS. 2A to 2C.

Assistants 15 are located radially inside the positions of projections 6 formed at the left and right hand ends of the sheet 1 and have thickness T greater than height H of projections 6, see FIG. 5A. They are located 5 mm or more inside the side ends of sheets 1 and 2, and have thickness T of 20 to 200 $\mu$m. The assistants 15 are used in pairs via plain sheet 2, one or a plural numbers in each side of sheet 2, with width W of 0.5 to 5 mm and the total width of the assistants 15 being 0.3 to 20% of width L of sheet 1 or 2. The pairs of the bonding assistants 15 facing to each other via plain sheet 2 increase the contacting pressure between plates 1 and 2, while the pairs may be shifted to each other to increase the thermal stress easing capability, see FIG. 6.

<<Technical Merits>>

According to the present invention, catalyst carrier 14 are produced by the steps of ①preparing sheets 1 and 2, ②preparing bonding assistants 15, ③winding and ④diffusion bonding. Sheets 1 and 2 are wound with assistants 15 therebetween, and produced carrier 14 has the features below.

First, sheets 1 and 2 are diffusion bonded to each other via bonding assistants 15 with locally strong contacting pressure, without the influence of projections 6 formed at side ends of sheet 1. That is, the top and the bottom of sheet 1 are diffusion bonded under high contacting pressure to plain sheet 1 by using bonding assistants 15, not by contact at points, but by contact at short lined areas. The assistants 15 are located at predetermined positions and have predetermined thickness T and width W. Therefore, they are not influenced by projections 6 when pressed, receive high pressure when corrugated sheet 1 is expanded under heat, and receive locally centered pressure at short lined areas, see FIGS. 5A and 5C.

Consequently, catalyst carrier 14, whose sheets 1 and 2 are diffusion bonded firmly to each other, is improved in trembling-resistant, heat resistant thermal stress easing properties and is strong.

Second, the excellent properties are easily realized by only holding bonding assistants 15 with predetermined thickness T and width W at predetermined positions and carrier 14 is easily produced as discussed below.

Figure 10A:
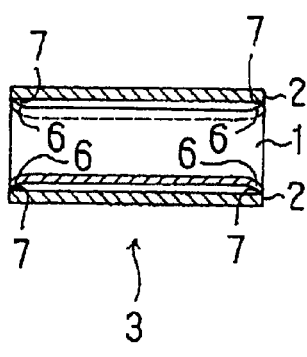
Figure 10B:
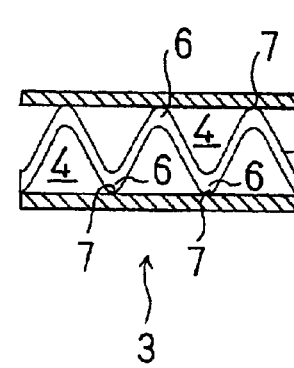
Figure 10C:
Figure 10D:
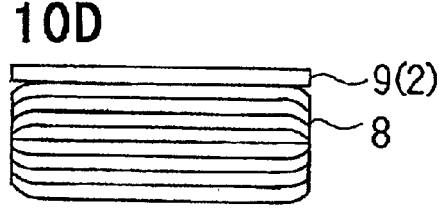
Figure 10E:
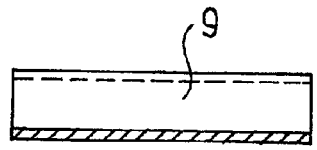
Figure 10F:
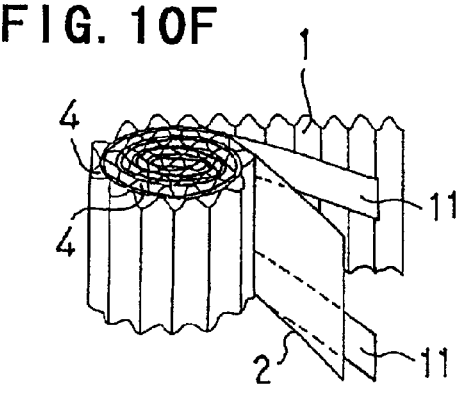
Figure 10G:
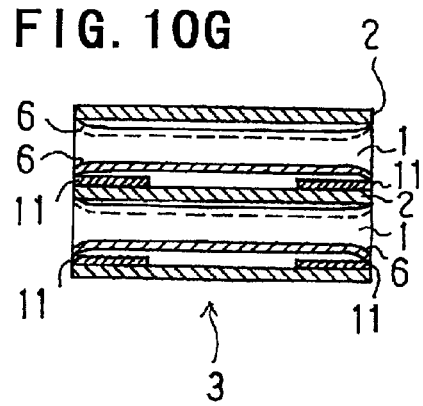
Figure 10H:
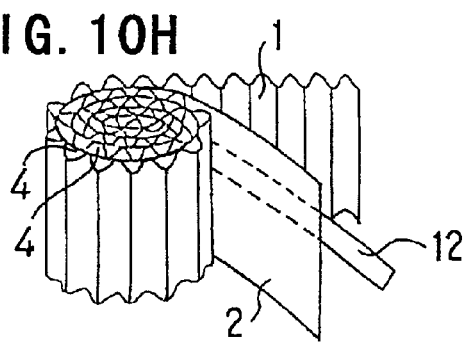
Figure 10I:
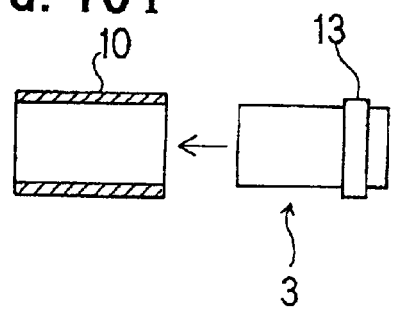

According to the invention, conventional toothed gears 5 are used to produce corrugated sheets 1 having diffusion projections 6 at side ends, see FIG. 1, and no special toothed gears 8 as shown in FIG. 10D is needed and there is no need to remove projections 6 from corrugated sheets 9, as shown in FIG. 10E.

At the diffusion-bonding step④, the roll of sheets 1 and 2 with assistants 15 is inserted into cylinder 10 without being strongly pressed, as shown in FIG. 3.

Corrugated sheet 1 having an approximately triangular shape with dull ends (tops) are used for the invention. Therefore no special procedure is necessary, such as pressing sheet 1 to remove the projections or using a sheet having no dull ends. Further, no procedure to remove surface roughness of sheet 1 is needed since a high contact pressure for strong bonding is obtained by the use of assistants 15.

Sheets 1 and 2 rolled with pressure of only maintaining its shape is simply inserted into cylinder 10, as discussed above. Since corrugated sheet 1 expands by heat, high contact pressure is applied locally to positions where the sheet 1,2 contacts the bonding assistants 15 and the diffusion bonding proceeds with a sufficient bonding strength. There is no need to provide a further process to obtain sufficient contact pressure for the diffusion bonding.

The bonding step④ itself is simple. As discussed above, a contact pressure necessary for the diffusion bonding is obtained locally by the use of bonding assistants 15, and no strict control on the atmosphere, temperature and time is needed.

Figure 5D:
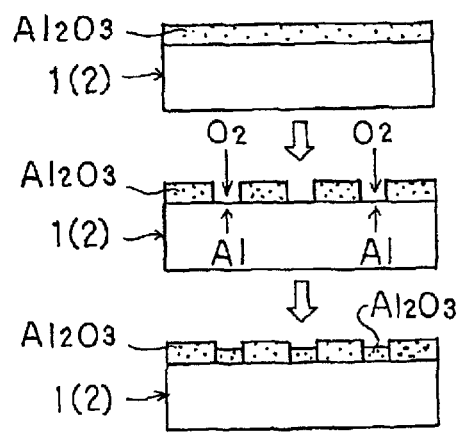
FIG. 5D each is a view for explaining oxide layers.

A protective oxidized layer, $Al_2O_3$, is formed on the surface of sheets 1 and 2, as shown in FIG. 5D. When the surface is heated, the layer is broken due to the difference in thermal expansion coefficient between the sheets 1,2 and the layer. As the result, aluminum in the sheets 1,2 diffuses outside, reacts with oxygen in air and forms new oxidized layer $Al_2O_3$. In this way, the surface of the sheets 1,2 is always covered with protective oxidized layer to assure the oxidation resistant properties.

The protective oxidized layer $Al_2O_3$ is quite thin (5 $\mu$m or less) and is broken under heat. Therefore, the layers of sheets 1 and 2 are exposed and directly contacted with each other if high pressure is applied as is the case with the present invention, and they 1,2 are diffusion bonded. Contrary to this, if high pressure cannot be applied to surfaces, it is necessary to strictly control the processing conditions such as atmosphere, temperature and time while evaporating aluminum.

According to the invention, a high contacting pressure is locally obtained to bond the sheets 1,2 by using bonding assistants 15, the processing conditions need not be strictly controlled. That is, the diffusion bonding process can be carried out in wide range of low pressure or reduction conditions, at relatively low temperature and in relatively short time. Thus, the diffusion bonding process can be simplified according to the invention.

EXAMPLES

<<Data Conditions>>

In examples below, the strength of catalyst carrier 14 as shown in FIG. 3C was tested using bonding assistants 15 of various thickness T and width W as illustrated in FIG. 5A. The strength herein means the resistance to passing through the carrier 14 or shearing strength between sheets 1 and 2, i.e., bonding strength. Data common to Examples 1 through 5 are as follows:

Diameter (ø) of carrier 14:60 mm

Number of cells: 310,000 cells/$m^2$ (200 cells/$inch^2$)

Thickness of sheets 1 and 2: 50 $\mu$m

Diameter (ø) of penetrator 24: 40 mm

The strength test was carried out as follows.

Figure 7A:
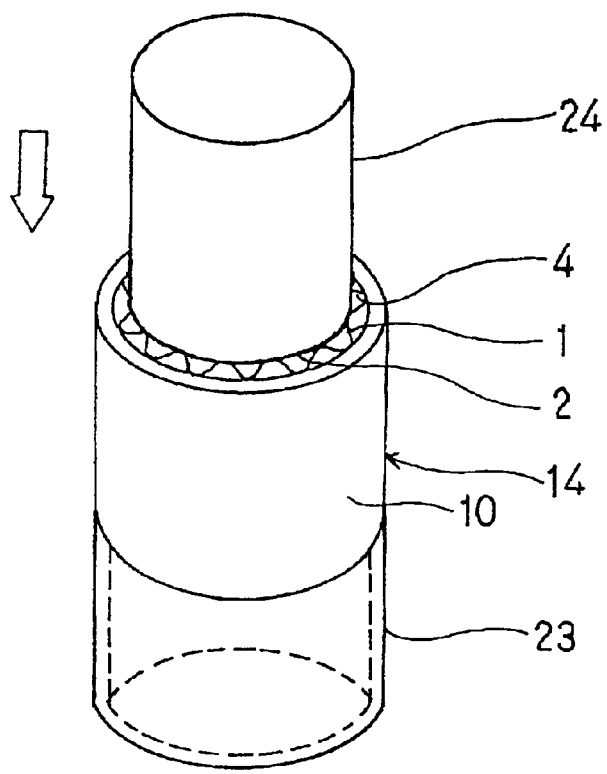
FIG. 7A is a perspective view of a carrier on which a weight is placed for strength tests.

Catalyst carrier 14 comprising a sheet roll in cylinder 10 was placed lengthwise on short cylindrical holder 23, see FIG. 7A. The holder has a diameter and a thickness same as those of cylinder 10 and supports the cylinder but do not carry an inner roll.

Penetrator 24 having a short cylindrical shape and a diameter smaller than that of carrier 14 was placed on the open top of the catalyst carrier 14, and was pressed at various load from above.

In FIGS. 7B, 8A, 8B and 9A showing the test results of Examples 1, 2, 3 and 4, respectively. Broken lines show the test results of conventional catalyst carriers 3 which do not use bonding assistants 15, carried out under same conditions. The results demonstrate that catalyst carriers 14 of Examples 1 through 4, which use bonding assistants, are far much stronger than conventional carriers 3.

Example 1

Figure 7B:
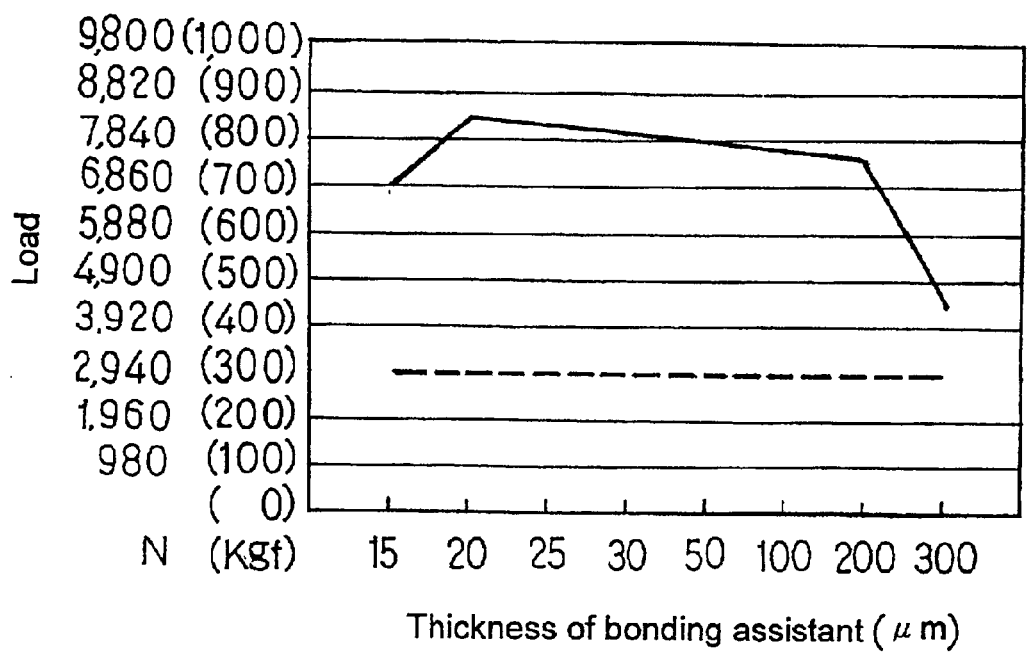
FIG. 7B is a graph showing the relationship between the thickness of bonding assistants and the carrier strength.

FIG. 7B shows the test results of the carrier strength when thickness T of bonding assistants 15 is varied. Supplemental data is as follows:

Overall shape: ø 60 mm×width L 60 mm

Bonding assistant: 5 mm width W×T (2 pairs of two assistants 15)

That is, catalyst carrier 14 has a diameter of 60 mm and width L of 60 mm, i.e. corrugated sheet 1 and of plain sheet 2 have width L of 60 mm. Bonding assistants 15 held between sheets 1,2 have width W of 5 mm and are used such that two pairs of two assistants 15 each face to each other via plain sheet 2.

FIG. 7B shows that the penetrating strength or sheering strength mentioned earlier was reduced when thickness T of bonding assistant 15 is 15 μm, since it is equal to height H, i.e., 15 μm, of triangular projection 6 formed at side ends of corrugated sheet 1. That is, the bonding or contacting pressure between sheets 1,2 was reduced because it was dispersed to two short lined areas of contact of two assistants 15 with plain sheet 2, and to two points at tops of projection 6.

When thickness T of assistants 15 is over 15 μm and less than 20 μm, a sufficient strength was obtained, since the pressure was centered to only two short line areas of contact of two assistants 15 with plain sheet 2.

When thickness T is over 200 μm, the strength is lowered again, since gap U between assistants 15 corresponding to thickness T (see FIGS. 6A and 6B) becomes too great to maintain sheets 1 and 2 in planar state. The results obtained in Example 1 show that the thickness T of bonding assistant 15 should be from 20 to 200 μm.

Example 2

Figure 8A:
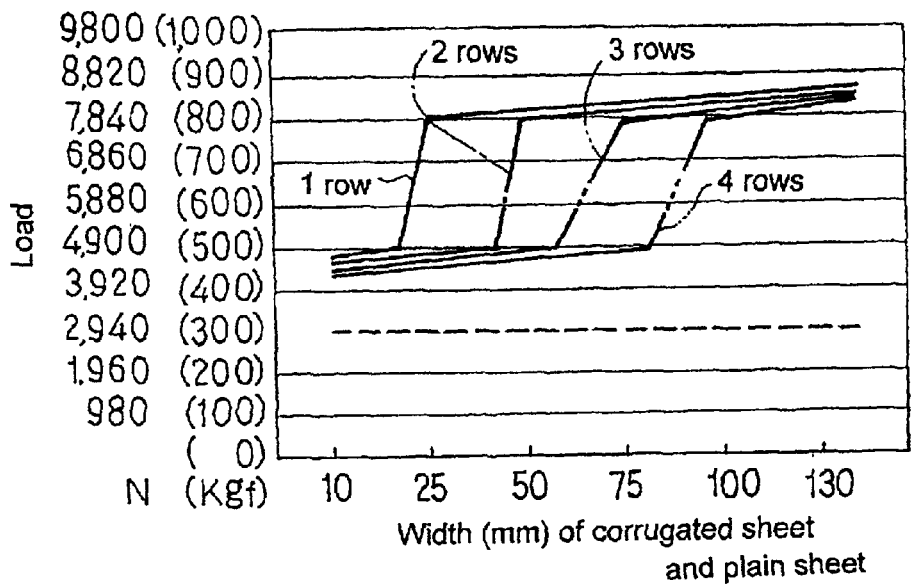
FIG. 8A is a graph showing the relationship between the number of assistants and the carrier strength.

In this example, the bonding or contacting strength was tested by varying width L of carrier 14 to obtain values shown in FIG. 8A. Supplemental data is as follows:

Overall shape: ø 60 mm×width L

Bonding assistant: 5 mm width W×100 μm thickness T

That is, width L, i.e., the axial length of catalyst carrier 14 which corresponds to radial width L of sheets 1 and 2, was varied and the strength was measured. 1, 2, 3 or four bonding assistants 15 held between sheets 1,2 which have width W of 5 mm and thickness T of 100 μm were used.

When one bonding assistant 15 was held between sheets 1 and 2, the strength of carrier 14 was reduced when width L is less than 25 mm, as will be seen from FIG. 8A. When two assistants 15 were used, the strength was reduced in the case where width L is less than 50 mm. When three assistants 15 were used, the strength was reduced in the case of less than 75 mm and when four assistants 15 were used, and the strength was reduced in the case of less than 100 mm.

From the results of Example 2, it was revealed that the total width of assistants 15, i.e., the total of each width W of all the assistants 15 including one assistant 15 held between sheets 1 and 2, is regulated by width L of carrier 14 which corresponds to width L of sheets 1 and 2. The pressure should be locally centered to the portion of the contact of assistants 15 with sheets 1,2. If ratio of sheet 1,2 width L to the total width of assistants 15 is less than a certain limit, the centered pressure becomes insufficient. Thus, it was revealed that the total width of assistants 15 is regulated by width L of sheets 1 and 2.

Example 3

Figure 8B:
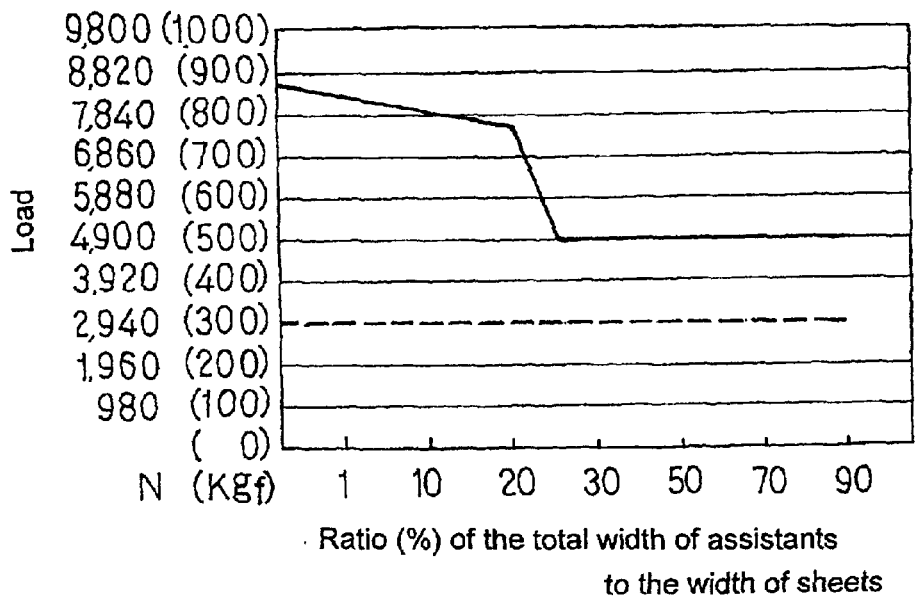
FIG. 8B is a graph showing the relationship between the ratio of the total width of assistants to the width of sheets and the carrier strength.

Example 3 was obtained based on the results of Example 2. FIG. 8B shows the results of the total of each width W of all bonding assistants 15 to width L of carrier 14 corresponding to sheet width L, to load. The data conditions of Example 3 are same as that of Example 2.

As discussed, the total of each width W of assistants 15 is regulated by width L of sheets 1 and 2 (width L of carrier 14). If not, the pressure is not centered, resulting in insufficient bonding strength between sheets 1,2.

FIG. 8B shows that the strength is reduced when the total width of each width W of assistants 15 is over 20% of width L of sheets 1,2 and it was revealed that the total width should be less than 20% of width L of sheets 1,2.

Since minimum width W is 0.5 mm and the minimum number of the assistant 15 is one and since maximum width L of sheets 1,2 is 150 mm, the minimum value of total width of each of assistants 15 to sheet width L is calculated by a formula (0.5/150)×100=0.3%. It was revealed, therefore, the ratio of the width total of assistants 15 to sheet width L is 0.3% or more and 20% or less.

Example 4

Figure 9A:
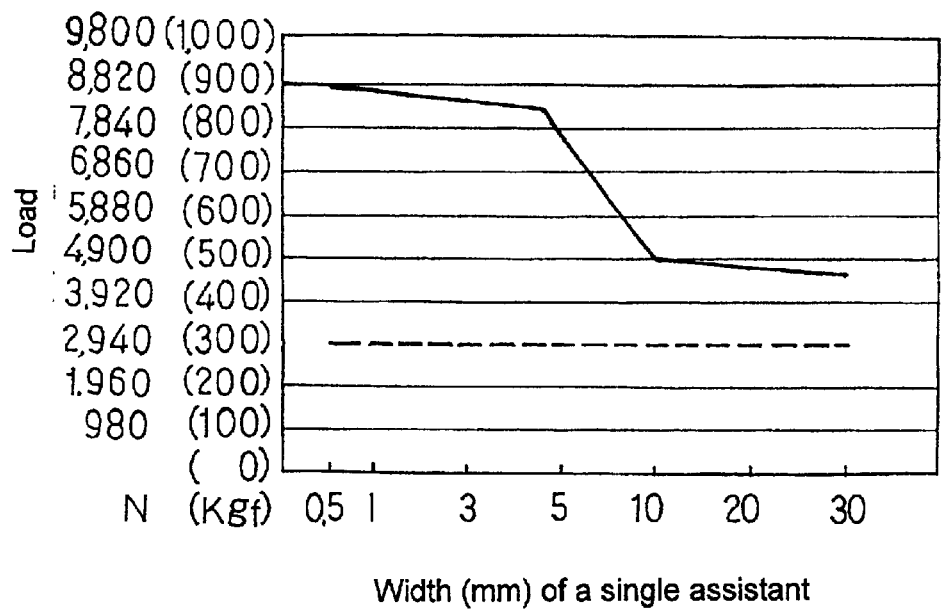
FIG. 9A is a graph showing the relationship between the width of a single assistant and the carrier strength.

Width W of bonding assistants 15 was varied and the strength of carrier 14 was measured to produce FIG. 9A. Supplemental data is as follows:

Overall shape: ø 60 mm×150 mm width L

Bonding assistant: width W×100 μm thickness T (two pairs of one assistant 15)

That is, catalyst carrier 14 has a diameter of 60 mm and width L of 150 mm, i.e. width L of corrugated sheet 1 and of plain sheet 2 is 150 mm. Bonding assistants 15 held between sheets 1,2 have thickness T of 100 μm and one assistant 15 per each surface of plain sheet 2, is used such that a pair of assistants 15 face to each other via plain sheet 2. For this Example 4, carrier 14 with assistants 15 having various width W was tested.

If one assistant 15 having width W of 30 mm is used for carrier 14 having width L (sheet width L) of 150 mm, the ratio according to the calculation formula of Example 3 is 20% and sufficient strength should be obtained. However, according to FIG. 9A showing the results of Example 4, sufficient strength was obtained for assistants 15 having width W of 5 mm or less. If width W is over 5 mm, the strength of carrier 14 is reduced. The reason can be thought as follows.

As has been discussed, locally centered pressure should be applied to the contact portion of assistant 15, provided between sheets 1 and 2. If width W of the assistant 15 is too broad, i.e., over 5 mm, the pressure scatters whereby no centered pressure is obtained, resulting in decrease of the strength. When the weight of load applied to carrier 14 is increased, assistant 15 will be broken prior to the time when sheets 1,2 is broken, and the sheets 1,2 will not be broken. In this instance, therefore, the bonding assistant 15 is broken and cut at the bonding interface.

Contrary to this, when width W is 5 mm or less and if the weight is increased, sheets 1 or 2 will be broken prior to the time assistant 15 is broken and the assistant 15 will not be broken. That is, when assistant 15 having 5 mm or less width is used, a strength greater than that at breaking point of sheets 1,2 is not obtained and, thus, the strength at 5 mm or less is relatively constant, as shown in FIG. 9A.

From the result above, it was revealed that width W of bonding assistant W should be 5 mm or less. Naturally, the minimum width is 0.5 mm and the value of the total width should be 20% or less to that of carrier width L, as discussed in Example 3.

Example 5

Figure 9B:
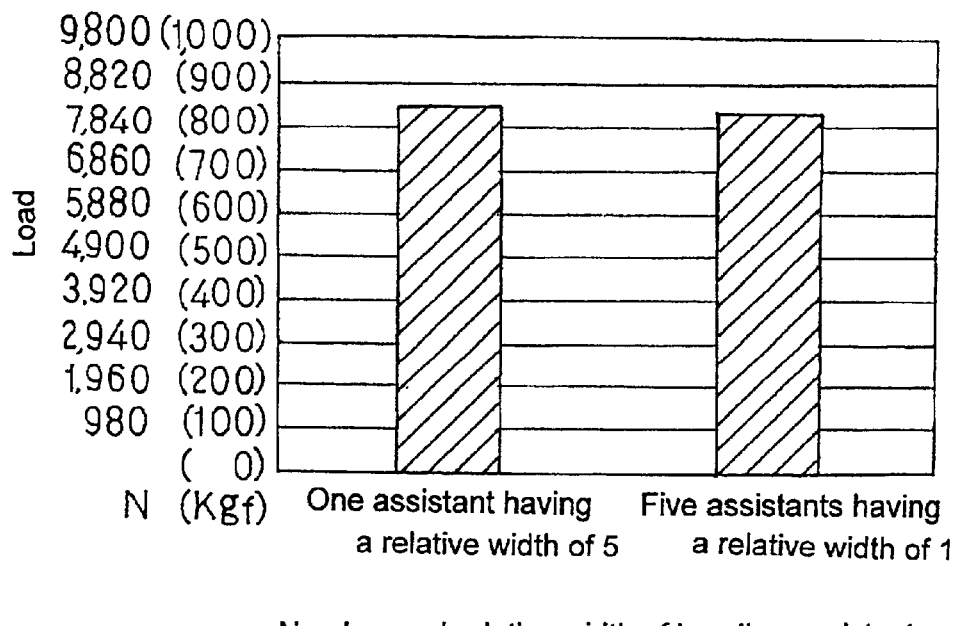
FIG. 9B is a graph showing the relationship between the number of assistants and the carrier strength.

In Example 5, the number of bonding assistants 15 was varied to produce the results shown in FIG. 9B. Supplemental data is as follows:

Overall shape: ø 60 mm×150 mm width L
Bonding assistant: 100 μm thickness T

That is, catalyst carrier 14 has a diameter of 60 mm and width L (sheet width L) of 150 mm. Bonding assistants 15 held between sheets 1 and 2 have thickness T of 100 μm and a pair or pairs of assistants 15 face to each other via plain sheet 2. For this example, the number (row) of the assistants 15 used was changed while the total width of assistants 15 was arranged same to all carriers and the strength of carrier 14 was measured.

It was revealed that the carrier 14 strength was not different between the case where one assistant having a relative width of 5 was used and the case where five assistants 15 having a relative width of 1 were used. This result shows that if the total width of assistants 15 is same, the strength of carriers 14 and the shearing strength or boding strength of sheets 1,2 are same even if the number of the assistants 15 used is different.

Technical Advantage of the Invention

The catalyst carrier for an exhaust gas clearing system of the invention is produced by holding thin-belt like bonding assistant or assistants between broader-belt like corrugated sheet and plain sheet, wherein the assistants are positioned radially inside the projections formed at ends of the corrugated sheet, with a thickness greater than the height of projections and with a predetermined width. With the above feature, the carrier of the invention has following technical advantages.

<<Strength>>

First, the catalyst carrier is excellent in the strength with regard to trembling resistant and heat-resistant properties and thermal stress easing properties. According to the invention, sheets are diffusion bonded by locally centered high pressure by using bonding assistants, in spite of projections formed on corrugated sheets. That is, sheets are bonded not at points, as is the case with conventional process, but at short line areas, The sheets are strongly bonded and have the strength necessary for making a strong catalyst carrier. Therefore, the carrier is improved in trembling resistant properties, for example, and it endures long run fatigue and exhaust gas pressure, and is most suitable for the use in two and four wheeled cars.

The catalyst career is composed of sheets of stainless steel containing aluminum and of bonding assistants of stainless steel and an oxidized protective layer is surely produced on the surfaces of the sheets. Therefore, the carrier has excellent oxidation resistant properties and is improved in heat resistant properties and heat resistant strength. Thus, also from this point, the carrier is most suitable for high temperature gas exhaust devices, and for two and four wheeled cars.

According to the carrier, the sheets are not diffusion bonded at all surfaces, but only at the linear portion of the contact of the bonding assistants with sheets and, therefore, thermal stress easing properties between bonded sheets are improved. Particularly, the properties are improved when each of the pair of bonding assistants is shifted to other via a plain sheet.

<<Costs>>

Second, the advantageous effect mentioned above can be realized in a simple manner, since the catalyst carrier can be produced by holding bonding assistants of a predetermined thickness and a width, at predetermined positions between sheets. The advantageous cost performance can be discussed as follows:

a. According to the invention, there is no need to prepare a number of special toothed gears to remove projections, which have been necessary for a conventional process. Since generally used gears can be used and corrugated sheets having projections are processed without a projections-removing process b. There is no need to apply pressure to a roll of sheets with bonding assistants when the roll is inserted into a cylinder as has been necessary in the conventional process. According to the invention, the roll is simply inserted into the cylinder and no high skill therefor is necessary.

c. There is no need to repeat a pressing work for removing the projections, to use flat corrugated sheets having no projections or to process sheets for flattering the surface roughness. According to the present invention, generally used corrugated sheets, which have bending portions, can be used without further process.

d. There is no need to form a throttled portion stated previously as fifth prior art example. Therefore, no instrument therefor is necessary and there is no fear that the corrugated shape may be destructed.

e. There is no strict control on atmospheric conditions, temperature and time since high contacting pressure is applied to sheets during diffusion bonding.

Accordingly, defects suffered in the conventional process are all overcome according to the present invention.

What is claimed is:

1. Catalyst carrier 14 for exhaust gas purification system 16, comprising bands of stainless steel-made at least one corrugated sheet 1 and at least one plain sheet 2 which hold stainless steel-made bonding assistants 15 therebetween, wherein said bonding assistants 15 have a width narrower than those of sheets 1 and 2, wherein said sheets 1 and 2 are alternated and are wound to form a roll having a honeycomb structure comprising a number of cell spaces 4, wherein catalyst materials 21 are adhered to sheets 1 and 2, wherein said sheets 1 and 2 are diffusion bonded to each other via bonding assistants 15, wherein said bonding assistants 15 are positioned radially inside from projections 6, which are formed at side ends of corrugated sheet 1 during passing sheet 1 through a pair of toothed gears 5, and wherein said bonding assistants 15 have thickness T greater than height H of projections 6.

2. A catalyst carrier according to claim 1, comprising one corrugated sheet 1 and one plain sheet 2, each being made of stainless steel containing aluminum, wherein said sheets 1 and 2 have substantially same length and width L, and the length of assistants 15 is substantially same as that of sheets 1 and 2.

3. A catalyst carrier according to claim 1, wherein assistants 15 are positioned 5 mm or more inside the side ends of sheets 1 and 2, and have thickness T of from 20 to 200 μm.

4. A catalyst carrier according to claim 3, wherein assistants 15 are used in a pair or pairs via plain sheet 2, and wherein width W of one assistant is 0.5 to 5 mm, and ratio of the total width of all assistants to width L of sheets 1 and 2 is 0.3 to 20%.

5. A catalyst carrier according to claim 4, wherein each of the pair or pairs of assistants 15 face to the other via plain sheet 2 to increase the contact pressure between sheets 1 and 2.

6. A catalyst carrier according to claim 4, wherein each of the pair or pairs of assistants 15 is shifted to the other via plain sheet 2 to improve thermal stress easing properties.

7. A method for producing catalyst carrier 14 for exhaust gas purification system 16, comprising, winding bands of stainless steel-made at least one corrugated sheet 1 and at least one plain sheet 2 which hold stainless steel-made bonding assistants 15 therebetween, to form a roll, wherein said bonding assistants 15 have a width narrower than that of sheets 1 and 2, and said sheets 1,2 are alternated, wherein said bonding assistants 15 are positioned radially inside from projections 6, which are formed at side ends of corrugated sheet 1 during passing sheet 1 through a pair of toothed gears 5, and heating the roll to diffusion bond the sheets 1 and 2 to each other via bonding assistants 15, to produce the roll having a honeycomb structure comprising a number of cell spaces 4, and adhering a catalyst material 21 to sheets 1 and 2 and bonding assistants 15.

\* \* \* \* \*